United States Patent
Hauptmann

(10) Patent No.: US 6,588,520 B2
(45) Date of Patent: Jul. 8, 2003

(54) ROCK DRILL

(75) Inventor: Udo Hauptmann, Landsberg/Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 14 days.

(21) Appl. No.: 09/941,114

(22) Filed: Aug. 28, 2001

(65) Prior Publication Data

US 2002/0027024 A1 Mar. 7, 2002

(30) Foreign Application Priority Data

Sep. 4, 2000 (DE) .......................... 100 43 428

(51) Int. Cl.[7] ............................... E21B 10/36
(52) U.S. Cl. ............... 175/430; 175/431; 175/435; 175/398; 76/108.1; 408/224; 408/218
(58) Field of Search .................. 175/426, 428, 175/430, 431, 435, 398, 412; 76/108.1; 408/224, 216, 218

(56) References Cited

U.S. PATENT DOCUMENTS

| | | | | |
|---|---|---|---|---|
| 4,248,555 A | * | 2/1981 | Satou | |
| 4,889,200 A | * | 12/1989 | Moser | |
| 5,735,648 A | * | 4/1998 | Kleine | |
| 6,450,273 B1 | * | 9/2002 | Kleine et al. | |

* cited by examiner

Primary Examiner—Roger Schoeppel
(74) Attorney, Agent, or Firm—Sidley Austin Brown & Wood, LLP

(57) ABSTRACT

A rock drill has at least one hard material insert (2) with at least two cutting edges (3, 7) consisting of hard material and extending radially to the drill axis (A), whereby, in a radial range of 20% to 50% of their drilling radius, at least two cutting edges (3, 7) each have an axial recess (4), and the cutting edges (3, 7) rotating around the drill axis (A) extend with their cutting edges in their entirety without any gaps over the entire drilling radius.

9 Claims, 1 Drawing Sheet

ROCK DRILL

BACKGROUND OF THE INVENTION

The invention relates to a rock drill for the abrasive working of rock or rock-like material by means of a drill movement that at least partially rotates and hammers or impacts with respect to the drill axis, the drill head having a hard material insert.

Customary rock drills have a hard material insert that is configured as a hard material plate or as a solid hard material head and that is attached in the tool head, which is followed by a shaft, often with a spiral helix, that finally ends in an insertion or chucking region wherein it is held in a tool device.

When drilling is performed with impact and hammer drills, two removal principles are superimposed:

chiseling by the drill cutting edges caused by axially applied impact energy, which takes place staggered in defined application angles and shatters the rock into chips, and milling of the chips by means of rotation of the cutting edges around the drill mid-point under axial advancing force.

The impact energy acting on the rock is distributed over the cutting edges present on the tool head, i.e., the more cutting edges being used or the greater the length of the cutting edges that are in contact, the less energy is available to chisel out parts of the rock. Several cutting edges distributed around the circumference, however, also translates into simultaneous removal by means of chiseling at several places in the cross section of the borehole. Moreover, the presence of a cutting edge over the entire drilling radius of the drill is necessary in order to ensure the cutting-milling effect over the full borehole cross section and in order to create a borehole without a remaining drilling core with a defined diameter. Therefore, when the drill cutting edges are dimensioned, the interaction of both of these removal principles should be taken into consideration in order to optimize the chip removal.

According to U.S. Pat. No. 2,673,714, a cutting plate for a drilling tool forms two roof-shaped, slanted cutting edges, whereby one cutting edge is provided with a recess. The other cutting edge extends without any gaps over the entire drilling radius of the drill.

According to German Patent No. 2,523,201, a replaceable cutting plate of a drill that removes material by means of cutting has two roof-shaped, slanted cutting edges, whereby both cutting edges are interrupted by radially arranged recesses in various radial areas and the cutting edges that rotate around the drill axis extend in their entirety without any gaps over the entire drilling radius. The radially arranged recesses of the cutting edge, which are configured to tear off the chips, do not lead to a reduction of the lengths of the cutting edges and consequently lead to a more efficient utilization of the impact energy for an axially impacting stress for purposes of chiseling.

SUMMARY OF THE INVENTION

The objective of the invention is to create a rock drill with cutting edges that are dimensioned for optimal chip removal.

Essentially, the tool head of a rock drill has at least two cutting edges consisting of hard material and extending radially with respect to a drill axis, whereby at least two cutting edges have an axially extending recess in the cutting edges in a radial range of 20% to 50% of their drilling radii, other cutting edges rotating around the drill axis extend in their entirety without any gaps over the entire drilling radius.

Advantageously, a shared hard material insert forms the cutting edge areas that are interrupted by the recess, as a result of which these areas are rigidly and securely connected to each other, and also advantageously, the radial area of the recess serves to attach the hard material insert to the tool head.

As the hard material insert, both flat hard material plates as well as compact solid hard steel heads can advantageously be used, as a result of which well-established solutions can be incorporated.

Advantageously, in the case of cutting edges rotating around the drill axis, all of the radial recess areas generated by at least one recess amount to 40% to 60% of the total radial drilling radii, as a result of which the impact energy can be applied with greater concentration into the rock or other material being drilled.

Preferably, in the case of cutting edges rotating around the drill axis, the radially recessed areas of individual cutting edges are positioned radially differently, without covering shared radial recess areas, as a result of which insufficiently fatigued radial recess areas in the rock are avoided.

Advantageously, in the case of cutting edges rotating around the drill axis, the radial cutting edge areas that are not interrupted by recesses each comprise a radial area of 20% to 50% of the drilling radii, as a result of which preferred radial cutting edge areas are formed in the rock for shattering it into chips.

Advantageously, radial cutting edge areas and radial recess areas are arranged alternately, whereby each radial area comprises 20% to 35% of the drilling radii, as a result of which a uniform distribution of the radial cutting edge areas in the rock is achieved for the shattering into chips.

Advantageously, the tool head has more than two cutting edges, preferably three, as a result of which a radial guidance of the tool head in the borehole is achieved.

Also advantageously, the cutting edges are uniformly distributed in terms of their angular spacing, as a result of which a uniform resistance torque is attained during the working.

Preferably, either one main cutting edge or the secondary cutting edges are configured without recesses, as a result of which a complete removal of the drilling is achieved.

BRIEF DESCRIPTION OF THE DRAWINGS

The invention is explained in greater depth with reference to an advantageous embodiment, with.

BRIEF DESCRIPTION OF THE INVENTION

Figure 1:
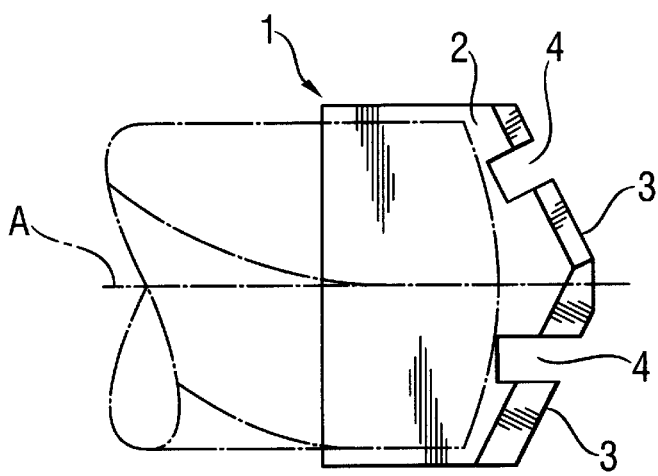
FIG. 1 is an axially extending side view of a hard material insert of a rock drill.

According to FIG. 1, a tool head 1 (not shown in its entirety) of a rock drill has a hard material insert 2 in the form of a hard material plate that forms two main cutting edges 3 arranged diametrically opposite with respect to a drill axis A. Each main cutting edge 3, in a radial extending area of 20% to 25% of its drilling radii, has a differently radially positioned axial recess 4 that is arranged parallel to the drill axis A and perpendicular to the cutting edge of a main cutting edge 3. A joint hard material insert 2 forms the cutting edge areas that are interrupted by the recess 4.

Figure 2:
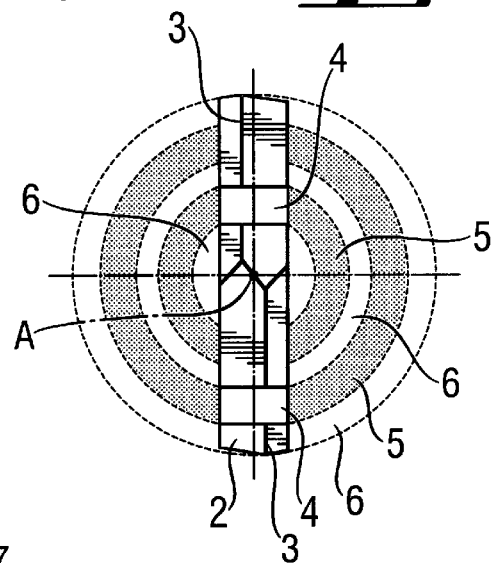
FIG. 2 is a planar view of a rock drill with two main cutting edges.

According to FIG. 2, when they rotate around the drill axis A, the recesses 4 of a rock drill (not shown here) with a hard material insert 2 having two main cutting edge 3 each generate a different, non-overlapping, radial recess area 5 and remaining radial cutting edge areas 6, whereby the entirety of the radial recess areas 5 amounts to about 40% and the entirety of the radial cutting edge areas 6 amounts to about 60% of the total drilling radii. The radial cutting edge areas 6 and the radial recess areas 5 are arranged alternately, whereby each radial area comprises about 20% of the drilling radii.

Figure 3:
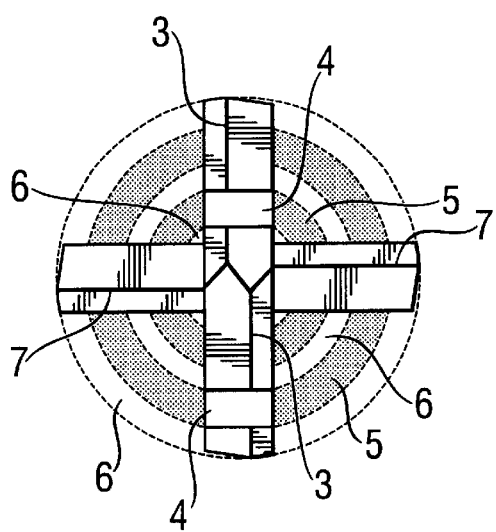
FIG. 3 is a planar view of a rock drill with two main cutting edges and two secondary cutting edges.

According to FIG. 3, the tool head has four cutting edges, whereby each main cutting edge 3 has one differently radially positioned recess 4 and each secondary cutting edge 7 has none.

Figure 4:
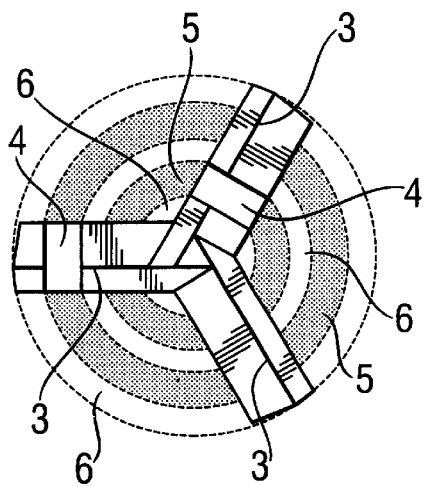
FIG. 4 is a planar view of a rock drill with three main cutting edges.

According to FIG. 4, the tool head has three main cutting edges 3 which are uniformly distributed along the circumference in terms of their angular distance, whereby two main cutting edges 3 each have one differently radially positioned recess 4 and one main cutting edge 3 has none.

What is claimed is:

1. A rock drill for abrasive working of rock or rock-like material where the drill movement at least partially rotates and impacts with respect to a drill axis (A), said rock drill having a drill head (1) with at least one hard material insert (2) secured to the drill head, said insert (2) has at least two hard material cutting edges (3, 7) extending radially outwardly from and spaced angularly apart relative to the drill axis (A), said cutting edges each having a radial extent outwardly from said drill axis, wherein at least two said cutting edges have recesses (4) extending axially inwardly for a part of the axial dimension of said hard material insert (2) from said cutting edges in the range of 20% to 50% of the radial extent thereof and with said recesses spaced radially apart at different radial dimensions relative to the drill axis whereby said cutting edges rotating around the drill axis form radially spaced apart continuous annular cutting surfaces and recesses.

2. A rock drill, as set forth in claim 1, wherein one said hard material insert (2) forms said cutting edges interrupted by said recesses (4).

3. A rock drill, as set forth in claim 1, wherein said hard material insert (2) is formed by one of one of a flat sided hard material plate and a solid hard material head.

4. A rock drill, as set forth in claim 3, wherein the entirety of the area of said at least one recess amounts to 40% to 60% of the total drilling radius.

5. A rock drill, as set forth in claim 1, wherein at least one said hard material insert (6) free of a recess (4) is formed having a radially extending area of 20% to 50% of the drilling radius of said other hard material inserts.

6. A rock drill, as set forth in claim 1, wherein the areas of said radial cutting edges and the area of said radial recesses are arranged alternately to one another and each of the radial areas of both comprises 20% to 35% of the area of the drilling radius.

7. A rock drill, as set forth in claim 1, wherein said drill head (1) has at least three said cutting edges (3, 7).

8. A rock drill, as set forth in claim 7, wherein said cutting edges are uniformly angularly spaced apart around said drill axis (A).

9. A rock drill, as set forth in claim 8, wherein said cutting edges comprise at least two main cutting edges (3) and at least one secondary cutting edge (7) and at least one of said main cutting edges (3) and said secondary cutting edges (7) is free of said recesses (4).

* * * * *